(12) United States Patent
Ishii

(10) Patent No.: US 8,034,300 B2
(45) Date of Patent: Oct. 11, 2011

(54) APPARATUS FOR PRODUCING TRICHLOROSILANE

(75) Inventor: Toshiyuki Ishii, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 197 days.

(21) Appl. No.: 12/312,367

(22) PCT Filed: Nov. 27, 2007

(86) PCT No.: PCT/JP2007/072828
§ 371 (c)(1),
(2), (4) Date: May 7, 2009

(87) PCT Pub. No.: WO2008/066027
PCT Pub. Date: Jun. 5, 2008

(65) Prior Publication Data
US 2010/0055007 A1   Mar. 4, 2010

(30) Foreign Application Priority Data

Nov. 29, 2006  (JP) .................................. 2006-322628
Oct. 24, 2007  (JP) .................................. 2007-276843

(51) Int. Cl.
*C01B 33/107* (2006.01)
*C23C 16/24* (2006.01)

(52) U.S. Cl. ........ 422/199; 422/149; 422/232; 423/348; 423/349; 423/350; 117/200; 117/900; 427/588; 118/724; 118/725; 118/719

(58) Field of Classification Search .................. 422/149, 422/199, 232; 423/348, 349, 350; 117/200, 117/900; 427/588
See application file for complete search history.

(56) References Cited

U.S. PATENT DOCUMENTS

| | | | | |
|---|---|---|---|---|
| 3,053,638 A | * | 9/1962 | Reiser | 423/348 |
| 3,099,534 A | * | 7/1963 | Schweickert et al. | 423/346 |
| 4,147,814 A | * | 4/1979 | Yatsurugi et al. | 427/588 |

(Continued)

FOREIGN PATENT DOCUMENTS

| | | |
|---|---|---|
| JP | 60-036317 | 2/1985 |
| JP | 62-123011 | 6/1987 |
| JP | 2003-020217 | 1/2003 |

OTHER PUBLICATIONS

International Search Report dated Feb. 19, 2008, issued on PCT/JP2007/072828.

*Primary Examiner* — Walter Griffin
*Assistant Examiner* — Huy-Tram Nguyen
(74) *Attorney, Agent, or Firm* — Edwards Angell Palmer & Dodge LLP

(57) ABSTRACT

This apparatus for producing trichlorosilane includes: a vessel having a gas inlet that introduces a feed gas into the vessel and a gas outlet that discharges a reaction product gas to the outside; a plurality of silicon core rods provided inside the vessel; and a heating mechanism that heats the silicon core rods, wherein a feed gas containing silicon tetrachloride and hydrogen is reacted to produce a reaction product gas containing trichlorosilane and hydrogen chloride. The silicon core rods may be disposed so as to stand upright on the bottom of the vessel, and the heating mechanism may have electrode portions that hold the lower end portions of the silicon core rods on the bottom of the vessel and a power supply that applies an electric current to the silicon core rods through the electrode portions to heat the silicon core rods.

4 Claims, 2 Drawing Sheets

U.S. PATENT DOCUMENTS

| | | | |
|---|---|---|---|
| 4,481,232 A | | 11/1984 | Olson |
| 4,596,741 A | * | 6/1986 | Endou et al. ............ 428/368 |
| 4,805,556 A | * | 2/1989 | Hagan et al. ............ 118/725 |
| 5,552,039 A | * | 9/1996 | McBrayer et al. ............ 210/90 |
| 5,906,799 A | * | 5/1999 | Burgie et al. ............ 422/241 |
| 2002/0014197 A1 | * | 2/2002 | Keck et al. ............ 117/87 |
| 2003/0127045 A1 | * | 7/2003 | Keck et al. ............ 117/200 |

* cited by examiner

APPARATUS FOR PRODUCING TRICHLOROSILANE

TECHNICAL FIELD

The present invention relates to an apparatus for producing trichlorosilane, which converts silicon tetrachloride into trichlorosilane.

This application claims priority on Japanese Patent Application No. 2006-322628, filed on Nov. 29, 2006, and Japanese Patent Application No. 2007-276843, filed on Oct. 24, 2007, the contents of which are incorporated herein by reference.

BACKGROUND ART

Trichlorosilane ($SiHCl_3$), which is used as a raw material for the production of highly pure silicon (Si), can be produced by conversion through a reaction of silicon tetrachloride ($SiCl_4$: tetrachlorosilane) with hydrogen.

In other words, silicon is produced by the reductive reaction and the thermolysis reaction of trichlorosilane represented by reaction schemes (1) and (2) shown below, and trichlorosilane is produced by the conversion reaction represented by reaction scheme (3) shown below.

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing trichlorosilane, for example, Patent Document 1 proposes an apparatus in which a plurality of heaters made of carbon are provided inside a reactor and these heaters made of carbon are directly energized and heated; thereby, heating a feed gas introduced to the reactor which contains hydrogen and silicon tetrachloride and converting the feed gas into trichlorosilane. In addition, a silicon compound such as silicon carbide is coated on the surface of this heater made of carbon. In other words, by protecting carbon with the coating film containing a silicon compound, the generation of impurities such as methane, methylchlorosilane, silicon carbide, and the like by the reaction of carbon with hydrogen, chlorosilane and hydrogen chloride in the feed gas and the reaction product gas can be prevented.

The following problems remain in the prior art described above.

In the above technique disclosed in Patent Document 1, silicon carbide or the like is coated on the surface of a heater made of carbon in order to prevent the generation of impurities. In this case, there were problems that the cost of the constituent members increased, and also the long-term usage of the heater could not be realized since the coating film of silicon carbide or the like was gradually etched to deteriorate.

Patent Document 1: Japanese Unexamined Patent Application, First Publication No. S62-123011

DISCLOSURE OF INVENTION

Problems to be Solved by the Invention

The present invention has been made in light of these problems and an object thereof is to provide an apparatus for producing trichlorosilane which can reduce the cost of the constituent members and which can also be configured from the constituent members having a longer operating time.

Means for Solving the Problems

The present invention employed the following constitution so as to solve the above problems.

The apparatus for producing trichlorosilane of the present invention includes: a vessel having a gas inlet that introduces a feed gas into the vessel and a gas outlet that discharges a reaction product gas to the outside; a plurality of silicon core rods provided inside the vessel; and a heating mechanism that heats the silicon core rods, and in the apparatus, a feed gas containing silicon tetrachloride and hydrogen is reacted to produce a reaction product gas containing trichlorosilane and hydrogen chloride.

In this apparatus for producing trichlorosilane, since the silicon core rods are heated by the heating mechanism rather than the heater made of carbon, the silicon carbide (SiC) coating becomes unnecessary, and thus the cost of the constituent members can be reduced and it is also possible to configure the apparatus from the constituent members having a longer operating time. Moreover, since carbon is not used as a heating element, impurities originating from carbon are not produced, and thus trichlorosilane with high purity can be obtained. Furthermore, due to the reductive reaction and the thermolysis reaction of the trichlorosilane, which is produced by the conversion reaction, silicon is also deposited on the silicon core rods, and thus trichlorosilane and silicon can be produced simultaneously.

In the apparatus for producing trichlorosilane of the present invention, the silicon core rods may be disposed so as to stand upright on the bottom of the vessel, and the heating mechanism may have electrode portions that hold the lower end portions of the silicon core rods on the bottom of the vessel and a power supply that applies an electric current to the silicon core rods through the electrode portions to heat the silicon core rods. According to the constitution of this apparatus for producing trichlorosilane, it is possible to employ an apparatus having almost the same specification as that of the reaction apparatus which is used when producing polysilicon by the so called Siemens process through the reductive reaction and the thermolysis reaction represented by the aforementioned reaction schemes (1) and (2). As a result, easy design and cost reduction can be achieved with a series of equipment as a whole made available for the aforementioned reaction schemes (1), (2), and (3).

Also, the apparatus for producing trichlorosilane may include: a heat insulating material provided on the inner wall of the vessel; and a heat-insulating-material protecting material (protecting material to protect the heat insulating material) provided on the inner surface of the heat insulating material and including carbon and silicon carbide which is coated on the surface of the carbon. In this apparatus for producing trichlorosilane, since a heat-insulating-material protecting material that is formed by coating silicon carbide on the carbon surface is provided on the inner surface of a heat insulating material, which is provided on the inner wall of the vessel, thermal efficiency can be improved and the deposition of silicon on the surface of the heat insulating material can also be prevented.

Effects of the Invention

According to the present invention, the following effects are exerted.

That is, according to the apparatus for producing trichlorosilane of the present invention, since the silicon core rods are heated by the heating mechanism, the conventional coating of silicon carbide on the heater made of carbon becomes unnecessary, and thus the cost of the constituent members can be reduced and it is also possible to configure the apparatus from the constituent members having a longer operating life. In addition, since silicon is also deposited on the silicon core rods, trichlorosilane and silicon can be produced at the same time.

DESCRIPTION OF THE REFERENCE SYMBOLS

1: Gas inlet; 2: Gas outlet; 3: Vessel; 4: Bottom of the vessel; 5: Silicon core rod; 6: Heating mechanism; 6a: Electrode portion; 6b: Power supply; 7a: Heat insulating material; and 7b: Heat-insulating-material protecting material.

BEST MODE FOR CARRYING OUT THE INVENTION

Figure 1:
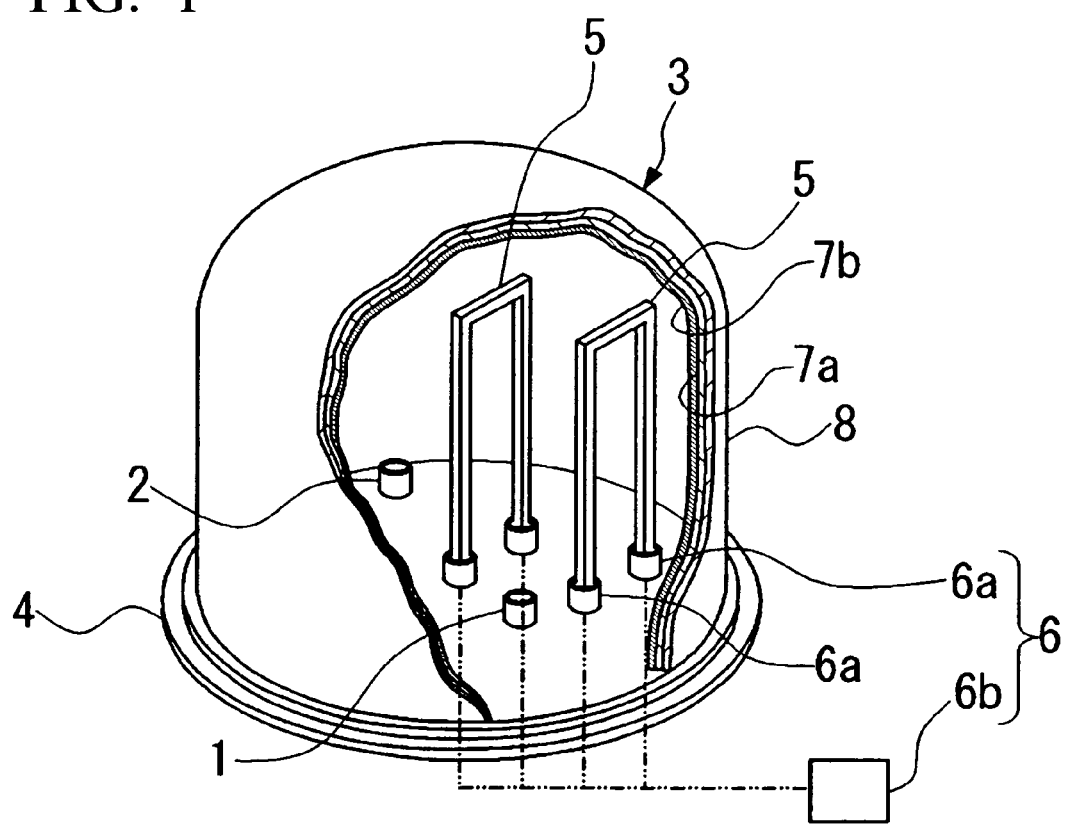
FIG. 1 is a perspective view (a partially broken-out section view) showing an embodiment of an apparatus for producing trichlorosilane according to the present invention.
Figure 2:
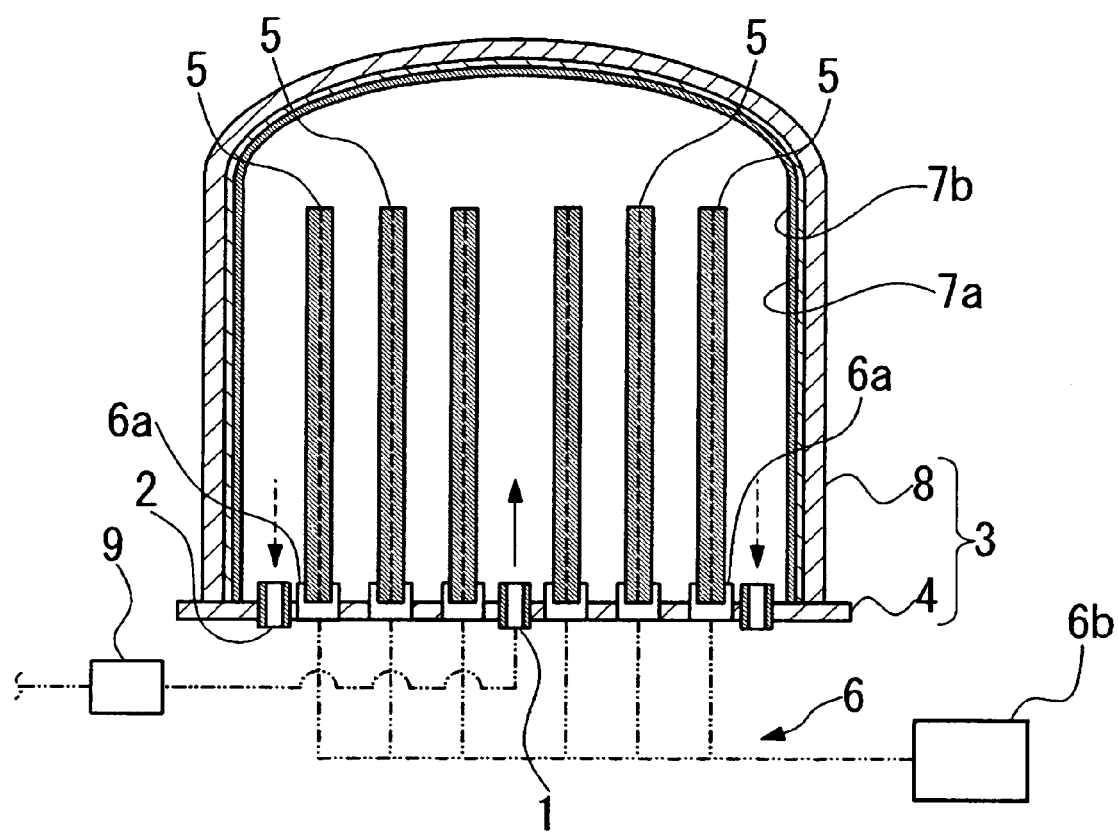
FIG. 2 is a cross sectional view showing an apparatus for producing trichlorosilane of the present embodiment.

An embodiment of the apparatus for producing trichlorosilane according to the present invention will be described below with reference to FIG. 1 or 2.

The apparatus for producing trichlorosilane of the present embodiment is an apparatus in which a feed gas containing silicon tetrachloride and hydrogen is subjected to a conversion reaction at a high temperature to produce a reaction product gas containing trichlorosilane and hydrogen chloride. As shown in FIGS. 1 and 2, the apparatus includes a vessel 3 having a plurality of gas inlets 1 that introduce a feed gas into the vessel and a plurality of gas outlets 2 that discharge a reaction product gas to the outside; a plurality of silicon core rods 5 disposed so as to stand upright on the bottom 4 inside the vessel 3; a heating mechanism 6 that heats the silicon core rods 5 due to Joule heat by applying an electric current to the silicon core rods 5; a heat insulating material 7a provided on the inner wall of the vessel 3; and a heat-insulating-material protecting material 7b provided on the inner surface of this heat insulating material 7a.

The vessel 3 has the bottom 4, which is provided with a plurality of the abovementioned gas inlets 1 and gas outlets 2, and a bell jar portion 8 which covers this bottom 4 and is formed into a bell shape. A plurality of gas outlets 2 are disposed at regular intervals in a circumferential direction in the vicinity of the peripheral edge portion of the bottom 4. Further, the gas inlets 1 are disposed on the inner side, as compared to the positions where the gas outlets 2 are disposed.

The heat insulating material 7a is provided on the inner surface of the bell jar portion 8 and is formed of carbon fiber. The heat-insulating-material protecting material 7b is a carbon vessel provided inside the heat insulating material 7a, and is formed by coating silicon carbide on the carbon surface.

The silicon core rods 5 are joined at the upper end portion and formed into an almost inverted U-shape.

The heating mechanism 6 has a plurality of electrode portions 6a that are provided on the bottom 4 and support the lower end portions of the silicon core rods 5 so as to hold the silicon core rods 5 in an upright position, and a power supply 6b that is connected with these electrode portions 6a and applies an electric current to the silicon core rods through the electrode portions 6a to heat the silicon core rods 5. This heating mechanism 6 carries out heating control so that the temperature of the silicon core rods 5 is within the range from 800 to 1,400° C.

If the temperature of the silicon core rods 5 is set to 1,200° C. or higher, the conversion ratio is improved. Also, silanes may be recovered by introducing disilanes to the feed gas.

A source for supplying the feed gas (not shown) is connected to the gas inlets 1. Also, a gas ratio adjusting section 9 including a flow control valve or the like, which controls the proportion of silicon tetrachloride in the feed gas, is connected to the gas inlets 1.

In this apparatus for producing trichlorosilane, when the feed gas, in which the proportion of silicon tetrachloride is set to a predetermined molar ratio by the gas ratio adjusting section 9, is introduced from the gas inlets 1 to the inside of the vessel 3, the feed gas is brought into contact with the silicon core rods 5, which are heated to a high temperature by the heating mechanism 6, to cause a conversion reaction; thereby, producing the reaction product gas containing trichlorosilane. Also, a portion of the produced trichlorosilane is further subjected to a thermolysis reaction and reductive reaction, and silicon is deposited on the surfaces of the silicon core rods 5. Therefore, silicon is formed and deposited from a portion of the trichlorosilane produced by the conversion reaction from silicon tetrachloride, and the remainder of the trichlorosilane is discharged to the outside through the gas outlets 2 and recovered.

If the diameter of the silicon core rods 5 becomes thick due to the deposition of silicon, the proportion of trichlorosilane is increased so that the deposition of silicon on the silicon core rods 5 is carried out even when the level of the electric current passed through the silicon core rods 5 is lowered; thereby, achieving both the conversion reaction into trichlorosilane and the deposition of silicon at the same time. In other words, it is set so that the production of trichlorosilane is mainly carried out in the early stage of the production process where the diameters of the silicon core rods 5 are small, whereas the silicon deposition due to the mixing of trichlorosilane and silicon tetrachloride is mainly carried out in the later stage of the production process where the diameters of the silicon core rods 5 have become large.

Since the silicon core rods 5 are heated by the heating mechanism 6 rather than the heater made of carbon in the present embodiment as described above, the silicon carbide (SiC) coating becomes unnecessary, and thus the cost of the constituent members can be reduced and it is also possible to configure the apparatus from the constituent members having a longer operating life. Moreover, since carbon is not used as a heating element, impurities originating from carbon are not produced, and thus trichlorosilane with high purity can be obtained.

Furthermore, due to the reductive reaction and thermolysis reaction of the trichlorosilane produced by the conversion reaction, silicon is also deposited on the silicon core rods 5, and thus trichlorosilane and silicon can be produced simultaneously.

As described above, since the silicon can be deposited from silicon tetrachloride, the load imposed on a distillation column that distills the trichlorosilane from metallurgical grade silicon in a previous step can be reduced, and the processing cost of the equipment as a whole can also be reduced.

Further, since a heat-insulating-material protecting material 7b that is formed by coating silicon carbide on the carbon surface is provided on the inner surface of a heat insulating material 7a, which is provided on the inner wall of the vessel 3, thermal efficiency can be improved and the deposition of silicon on the inner surface of the heat insulating material 7a can also be prevented.

The technical scope of the present invention is not limited to the above embodiment and various modifications which do not depart from the spirit of the present invention can be added.

For example, while the heating mechanism 6 applies an electric current to the silicon core rods 5 and thereby heating the silicon core rods 5 due to Joule heat in the above embodiment, the silicon core rods 5 may be heated by other methods such as a high frequency induction heating method.

In addition, although each of the silicon core rods 5 is disposed so as to stand upright on the bottom of the vessel 3, a constitution may be adopted, for example, in which each of the silicon core rods 5 is supported by being suspended from the ceiling portion of the vessel. Moreover, the silicon core rods 5 may not necessarily be standing in an upright position, but may be disposed in a horizontal state.

Furthermore, a mechanism for heat exchange between gasses, that is, the introduced feed gas and the discharged reaction product gas, may be provided. In this case, it is possible to achieve even further power savings.

INDUSTRIAL APPLICABILITY

According to the apparatus of the present invention for producing trichlorosilane, since the silicon core rods are heated by the heating mechanism, the conventional coating of silicon carbide on the heater made of carbon becomes unnecessary, and thus the cost of the constituent members can be reduced and it is also possible to configure the apparatus from the constituent members having a longer operating time. In addition, since silicon is also deposited on the silicon core rods, trichlorosilane and silicon can be produced at the same time. For this reason, the present invention can be suitably used in the process for producing trichlorosilane, which is used as a raw material for the production of highly pure silicon.

The invention claimed is:

1. An apparatus for producing trichlorosilane, comprising:
   a vessel having a plurality of gas inlets that introduce a feed gas into the vessel and a plurality of gas outlets that discharge a reaction product gas to the outside;
   a plurality of silicon core rods provided inside the vessel; and
   a heating mechanism that heats the silicon core rods,
   wherein the vessel has a bottom which is provided with the gas inlets and the gas outlets, and a bell jar portion which covers the bottom,
   the gas outlets are disposed at regular intervals in a circumferential direction in a vicinity of a peripheral edge portion of the bottom,
   the gas inlets are disposed on a side inner than positions where the gas outlets are disposed, and
   a feed gas containing silicon tetrachloride and hydrogen is reacted to produce a reaction product gas containing trichlorosilane and hydrogen chloride.

2. The apparatus for producing trichlorosilane according to claim 1,
   wherein the silicon core rods are disposed so as to stand upright on the bottom of the vessel, and
   the heating mechanism has electrode portions that hold the lower end portions of the silicon core rods on the bottom of the vessel and a power supply that applies an electric current to the silicon core rods through the electrode portions to heat the silicon core rods.

3. The apparatus for producing trichlorosilane according to claim 1,
   wherein the apparatus further comprises:
   a heat insulating material provided on an inner wall of the vessel; and
   a heat-insulating-material protecting material provided on an inner surface of the heat insulating material and including carbon and silicon carbide which is coated on the surface of the carbon.

4. The apparatus for producing trichlorosilane according to claim 2,
   wherein the apparatus further comprises:
   a heat insulating material provided on an inner wall of the vessel; and
   a heat-insulating-material protecting material provided on an inner surface of the heat insulating material and including carbon and silicon carbide which is coated on the surface of the carbon.

* * * * *